US012735572B2

(12) United States Patent
Okabe et al.

(10) Patent No.: US 12,735,572 B2
(45) Date of Patent: Sep. 15, 2026

(54) RUBBER PARTICLES, COMPOSITE PARTICLES AND PRODUCTION METHODS THEREOF

(71) Applicant: Shin-Etsu Chemical Co., Ltd., Tokyo (JP)

(72) Inventors: Shoji Okabe, Annaka (JP); Takahito Oki, Annaka (JP); Yoshinori Inokuchi, Annaka (JP); Shunji Aoki, Annaka (JP); Tsuneo Kimura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 643 days.

(21) Appl. No.: 18/014,818

(22) PCT Filed: Jul. 13, 2021

(86) PCT No.: PCT/JP2021/026331

§ 371 (c)(1),
(2) Date: Jan. 6, 2023

(87) PCT Pub. No.: WO2022/019179

PCT Pub. Date: Jan. 27, 2022

(65) Prior Publication Data

US 2023/0295426 A1 Sep. 21, 2023

(30) Foreign Application Priority Data

Jul. 21, 2020 (JP) ................................ 2020-124630

(51) Int. Cl.
*C08L 83/04* (2006.01)
*C08J 7/04* (2020.01)
*C08K 3/36* (2006.01)
*C08G 77/445* (2006.01)

(52) U.S. Cl.
CPC ............ *C08L 83/04* (2013.01); *C08J 7/0427* (2020.01); *C08K 3/36* (2013.01); *C08J 2367/04* (2013.01); *C08J 2383/04* (2013.01)

(58) Field of Classification Search
CPC ............................. C08L 83/04; C08G 77/445
See application file for complete search history.

(56) References Cited

U.S. PATENT DOCUMENTS 5,208,289 A 5/1993 Takarada et al.
5,538,793 A 7/1996 Inokuchi et al.
5,620,825 A 4/1997 Tavernier et al.
5,719,230 A 2/1998 Ando et al.
5,948,469 A 9/1999 Morita et al.
6,388,005 B1 * 5/2002 Morita .................... C08J 3/098 524/588
6,476,123 B1 11/2002 Morita et al.
6,531,542 B1 3/2003 Morita et al.
2006/0009555 A1 1/2006 Haubennestel et al.
2020/0317871 A1 10/2020 Inokuchi
2025/0057754 A1 * 2/2025 Sugiura ................. A61K 8/893

FOREIGN PATENT DOCUMENTS

CN 1718613 A 1/2006
CN 111356743 A 6/2020
JP 3-277645 A 12/1991
JP 4-348143 A 12/1992
JP 05-339511 * 12/1993
JP 7-196815 A 8/1995
JP 8-73664 A 3/1996
JP 8-209037 A 8/1996
JP 8-297380 A 11/1996
JP 2001-40097 A 2/2001
JP 2001-40214 A 2/2001
JP 2001-114899 A 4/2001
JP 2006-45559 A 2/2006

OTHER PUBLICATIONS

English language translation JP 05-3395111, Dec. 21, 1993.*
International Search Report (PCT/ISA/210), issued in PCT/JP2021/026331, dated Oct. 5, 2021.
Song et al., "PCL-PDMS-PCL Copolymer-Based Microspheres Mediate Cardiovascular Differentiation from Embryonic Stem Cells," Tissue Engineering, Part C, vol. 23, No. 10, 2017, pp. 627-640.
Chinese Office Action and Search Report for Chinese Application No. 202180059700.6, dated Dec. 3, 2024, with English translation.
Japanese Office Action for Japanese Application No. 2022-537944, dated Oct. 3, 2023, with English translation.

* cited by examiner

*Primary Examiner* — Margaret G Moore
(74) *Attorney, Agent, or Firm* — Birch, Stewart, Kolasch & Birch, LLP

(57) ABSTRACT

Provided are polysiloxane structure-containing rubber particles and composite particles having a high dispersibility and degradability; and production methods thereof. The rubber particles are comprised of a copolymer having a polyester structure and an organopolysiloxane structure, wherein the copolymer is a hydrosilylation crosslinked product of (A) a polyester having at least two aliphatic unsaturated groups per molecule; and (B) an organohydrogenpolysiloxane having at least two silicon atom-bonded hydrogen atoms per molecule. The composite particles are those with the surfaces of these rubber particles being coated with polyorganosilsesquioxane or silica.

6 Claims, No Drawings

RUBBER PARTICLES, COMPOSITE PARTICLES AND PRODUCTION METHODS THEREOF

TECHNICAL FIELD

The present invention relates to rubber particles, composite particles and production methods thereof.

BACKGROUND ART

Silicone rubber particles having rubber elasticity are used as a stress reliever for resins. For example, in the case of a heat-curable resin such as an epoxy resin used for packaging of electronic and electric parts, rubber particles are often added to make it less likely for a package to break even when it is subjected to a stress upon expansion due to a heat generated by an electric part. Further, rubber particles are also used in cosmetic materials for the purpose of imparting an extensibility and a feeling of use such as a soft sense of touch and a smoothness.

As silicone rubber particles, there are also proposed, for example, composite particles with silicone rubber particles being coated with a polyorganosilsesquioxane resin (Patent document 1: JP-A-Hei 7-196815); and composite particles with silicone rubber particles being coated with metal oxide fine particles such as silica (Patent document 2: JP-A-Hei 4-348143). These composite particles are characterized by having a low agglomeration property and a high dispersibility.

Further, as particles having a favorable dispersibility with respect to a thermoplastic resin or the like, Patent document 3: JP-A-2001-40214 discloses organic crosslinked particles prepared by subjecting a liquid composition comprised of an aliphatic saturated bond-containing organic compound and a silicon-containing organic compound having silicon atom-bonded hydrogen atoms to a hydrosilylation reaction and yet a crosslinking reaction.

PRIOR ART DOCUMENTS

Patent Documents

Patent document 1: JP-A-Hei 7-196815
Patent document 2: JP-A-Hei 4-348143
Patent document 3: JP-A-2001-40214

SUMMARY OF THE INVENTION

Problems to be Solved by the Invention

However, such silicone rubber particles that are to be added to for example resins and cosmetic materials have extremely small particle sizes; when discarded in the environment, it is assumed that they will directly flow into the ocean through inland water as it is tremendously difficult to collect them. The silicone rubber particles discarded in inland water and the ocean are not environmentally degradable as they do not have a degradation structure in the particle structure thereof; it is predicted that these particles will persistently remain in the environment.

In addition, there have been movements to restrict microplastics as microplastics in the ocean have a property of adsorbing hazardous substances in the environment and pathogens, which leads to a concern that the ecosystem will be negatively impacted. Due to such background, there is a gradual demand for a type of silicone rubber particles that are degradable and do not persistently remain as particles (solid) in the environment after use. In order for silicone rubber particles to be environmentally degraded, the crosslinked structure of the rubber particles needs to be degraded (broken) in the environment; however, since silicone rubber particles structurally do not have a degradability, a degradable functional group-containing structure has to be introduced into the crosslinked structure.

Specifically disclosed in Patent document 3 are particles prepared by crosslinking a polypropylene oxide having an allyl group at both ends with an organopolysiloxane having silicon atom-bonded hydrogen atoms; and particles prepared by crosslinking hexadiene with dimethylpolysiloxane-methylhydrogenpolysiloxane. These particles have a poor degradability as they do not have a degradable functional group(s) serving as a factor allowing them to be degraded in the environment.

Thus, it is an object of the present invention to provide polysiloxane structure-containing rubber particles and composite particles having a high dispersibility and degradability; and production methods thereof.

Means to Solve the Problems

The inventors of the present invention diligently conducted a series of studies to achieve the above object, and completed the invention as follows. That is, the inventors found that the above problems can be solved by rubber particles and composite particles that are comprised of a copolymer having a polyester structure and a polyorganosiloxane structure.

Thus, the present invention is to provide the following rubber particles, composite particles and production methods thereof.

[1].

Rubber particles comprised of a copolymer having a polyester structure and an organopolysiloxane structure.

[2].

The rubber particles according to [1], wherein the rubber particles have a spherical shape and a volume average particle size of 0.1 to 50 μm.

[3].

The rubber particles according to [1] or [2], wherein the copolymer is a hydrosilylation crosslinked product of (A) a polyester having at least two aliphatic unsaturated groups per molecule; and (B) an organohydrogenpolysiloxane having at least two silicon atom-bonded hydrogen atoms per molecule, provided that excluded is a combination where there are two said aliphatic unsaturated groups per molecule of the component (A) and there are two said silicon atom-bonded hydrogen atoms per molecule of the component (B).

[4].

The rubber particles according to [3], wherein the component (A) which is the polyester having at least two aliphatic unsaturated groups per molecule is a component with molecular chain ends of a polyester or polyester copolymer having a linear or branched structure being substituted with aliphatic unsaturated groups.

[5].

The rubber particles according to [4], wherein the polyester structure of the component (A) is poly-ε-caprolactone.

[6].

The rubber particles according to any one of [3] to [5], wherein the component (B) is an organohydrogenpolysiloxane having at least two silicon atom-bonded hydrogen atoms per molecule, which is represented by the following general formula (1):

[Chemical formula 1]

(1)

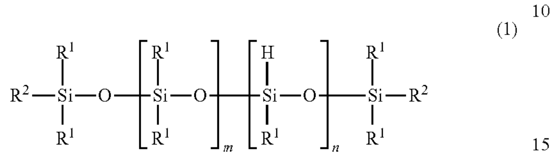

wherein each $R^1$ independently represents a substituted or unsubstituted monovalent hydrocarbon group having 1 to 30 carbon atoms; each $R^2$ independently represents a hydrogen atom, or a substituted or unsubstituted monovalent hydrocarbon group having 1 to 30 carbon atoms; m satisfies $1 \leq m \leq 1{,}000$; n satisfies $0 \leq n \leq 1{,}000$; provided that when n=0, the two $R^2$s are both hydrogen atoms, and that when neither of the two $R^2$s is a hydrogen atom, n is 2 or larger.

[7].

The rubber particles according to [6], wherein the component (B) is an organohydrogenpolysiloxane having at least two silicon atom-bonded hydrogen atoms per molecule, which is represented by the following general formula (2):

[Chemical formula 2]

(2)

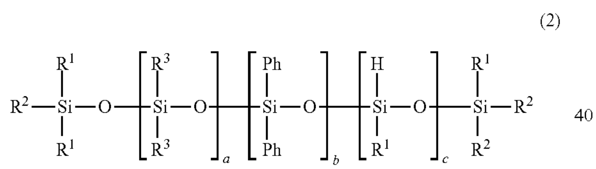

wherein $R^3$ represents a substituted or unsubstituted monovalent hydrocarbon group having 1 to 30 carbon atoms, other than a phenyl group; a, b and c satisfy $0 \leq a \leq 500$, $1 \leq b \leq 1{,}000$, $1 \leq a+b \leq 1{,}000$, and $0 \leq c \leq 1{,}000$; provided that when c=0, the two $R^2$s are both hydrogen atoms, and that when neither of the two $R^2$s is a hydrogen atom, c is 2 or larger.

[8].

Composite particles with the surfaces of the rubber particles according to any one of [3] to [7] being coated with polyorganosilsesquioxane or silica.

[9].

A method for producing the rubber particles according to any one of [3] to [7], comprising:

(i) a step of obtaining an O/W type emulsion by adding, for emulsification, a surfactant-containing water phase component to an oil phase component comprised of (A) a polyester having at least two aliphatic unsaturated groups per molecule and (B) an organohydrogenpolysiloxane having at least two silicon atom-bonded hydrogen atoms per molecule;

(ii) a step of obtaining (C) a rubber particle water dispersion by curing the oil phase component comprised of the components (A) and (B) in the emulsion via a hydrosilylation reaction under the presence of a hydrosilylation reactive catalyst; and (iii) a step of obtaining rubber particles by drying and removing water as a continuous phase from (C) the rubber particle water dispersion obtained in the step (ii).

[10].

A method for producing the composite particles according to [8], comprising:

(i) a step of obtaining an O/W type emulsion by adding a surfactant-containing water phase component to an oil phase component and performing stirring, the oil phase component being comprised of (A) a polyester having at least two aliphatic unsaturated groups per molecule and (B) an organohydrogenpolysiloxane having at least two silicon atom-bonded hydrogen atoms per molecule;

(ii) a step of obtaining (C) a rubber particle water dispersion by curing the oil phase component comprised of the components (A) and (B) in the emulsion via a hydrosilylation reaction under the presence of a hydrosilylation reactive catalyst;

(iii') a step of adding (E) an alkaline substance to (C) the rubber particle water dispersion obtained in the step (ii);

(iv) a step of obtaining a composite particle water dispersion by adding (F) one kind selected from an organotrialkoxysilane or tetraalkoxysilane represented by the following general formula (3) and a hydrolysate thereof to the rubber particle water dispersion of the step (iii') to which the alkaline substance has been added, whereby a condensation reaction is caused to allow the surfaces of the rubber particles to be coated with polyorganosilsesquioxane or silica,

[Chemical formula 3]

(3)

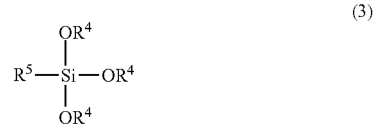

wherein $R^4$ represents a monovalent hydrocarbon group having 1 to 6 carbon atoms, $R^5$ represents a substituted or unsubstituted monovalent hydrocarbon group having 1 to 20 carbon atoms, or $-OR^4$; and (v) a step of obtaining composite particles by drying and removing water as a continuous phase from the composite particle water dispersion obtained in the step (iv).

Effects of the Invention

The rubber particles and composite particles of the present invention have a degradability as they contain ester groups as degradable functional groups (i.e. polyester structure) and a crosslinked structure will be broken in a water-bearing environment. Particularly, in terms of the polyester structure in the particles, particles having a poly-ε-caprolactone structure as a microbial recognition skeleton can also be expected to possess an environmental degradability of rubber particles.

In this way, the rubber particles and composite particles of the present invention are particles having a low agglomeration property, a high dispersibility and a high degradability; the rubber particles and composite particles of the present invention are anticipated as an environmental load-reducing material.

MODE FOR CARRYING OUT THE INVENTION

The present invention is described in detail hereunder.

The rubber particles of the present invention are rubber particles comprised of a copolymer having a polyester structure and an organopolysiloxane structure; the composite particles of the present invention are particles prepared by coating the surfaces of the aforesaid rubber particles with polyorganosilsesquioxane or silica.

Rubber Particles

There are no particular limitations on the shape of the rubber particles of the present invention; a spherical shape is preferable. In the present invention, "spherical" not only refers to a state where the particle shape is a true sphere, but also encompasses a state where the particle shape is a deformed ellipsoidal body whose aspect ratio (length of major axis/length of minor axis) is normally 1 to 4, preferably 1 to 2, more preferably 1 to 1.6, even more preferably 1 to 1.4, on average. The shape of the particles can for example be confirmed by conducting observation using an optical microscope or an electron microscope; and the aspect ratio is a value calculated as an average value after measuring the lengths of the major and minor axes of any 100 particles shown in a micrograph.

A volume average particle size of the rubber particles is preferably 0.1 to 50 μm, more preferably 0.5 to 40 μm, even more preferably 1 to 20 μm. When the volume average particle size of the rubber particles is smaller than 0.1 μm, the particles will exhibit a low fluidity and thereby a higher agglomeration property. Further, when performing coating with polyorganosilsesquioxane or silica, it will be difficult to uniformly coat the particles. A volume average particle size larger than 50 μm will result in a deteriorated smoothness, or may lead to a feeling of roughness. In the present invention, a particle size is a volume average particle size measured by an electrical resistivity method.

It is preferred that a rubber as a component of the rubber particles have no tackiness, and that a rubber hardness thereof be 5 to 90, more preferably 20 to 85, even more preferably 40 to 85, when measured by ASKER Durometer Type C as prescribed in The Society of Rubber Industry, Japan Standard (SRIS). A rubber hardness lower than 5 will result in a higher agglomeration property and a poor dispersibility accordingly.

It is preferred that the rubber particles of the present invention are particles prepared by copolymerizing, via a hydrosilylation reaction, a liquid composition of:

(A) a polyester having at least two aliphatic unsaturated groups per molecule; and (B) an organohydrogenpolysiloxane having at least two silicon atom-bonded hydrogen atoms per molecule (excluded here is a combination where there are two such aliphatic unsaturated groups per molecule of the component (A) and there are two such silicon atom-bonded hydrogen atoms per molecule of the component (B)).

The component (A) which is the polyester having at least two aliphatic unsaturated groups per molecule, may for example be one obtained by substituting the molecular chain ends of a polyester or polyester copolymer having a linear or branched structure with aliphatic unsaturated groups.

That is, the component (A) is one having a linear or branched structure, having at least one polyester structure (polyester repeating unit), and having aliphatic unsaturated groups at molecular chain ends. This component (A) is obtained by substituting the molecular chain ends of, for example, a polyester, a polyester copolymer or a polyester polyol with aliphatic unsaturated groups.

Examples of the aforesaid polyester include aliphatic polyesters such as poly-ε-caprolactone, poly-β-propiolactone, γ-butyrolactone, polylactic acid, polyhydroxybutyrate, polyglycolic acid, polyethylene adipate, polyhydroxybutyric acid, polyethylene succinate, and polybutylene succinate; and aromatic polyesters such as polyethylene terephthalate, polybutylene terephthalate, polyethylene naphthalate, and polytrimethylene terephthalate. Here, an aliphatic polyester is preferred as it is considered as having a higher degradability.

Further, the aforesaid polyester copolymer may for example be a copolymer of the aforesaid polyester and another kind of polymer. Such another kind of polymer may be one selected from the aforesaid polyesters, or a polymer other than a polyester such as a polyether and a polycarbonate. Due to the above reason, it is preferred that this polyester copolymer be a copolymer of aliphatic polyesters, examples of which include a L-lactic acid/ε-caprolactone copolymer and a L-lactic acid/glycolic acid copolymer.

Examples of the aforesaid polyester polyol include polyester polyols such as poly(ethylene adipate)ol, poly(tetramethylene adipate)diol, and poly(ethylene adipate)diol; and polylactone polyols such as poly(ε-caprolactone)diol, poly(ε-caprolactone)triol, and poly(ε-caprolactone)tetraol. Preferred are polylactone polyols; more preferred are a poly(ε-caprolactone)diol represented by the following formula (4), a poly(ε-caprolactone)triol represented by the following formula (5), and a poly(ε-caprolactone)tetraol represented by the following formula (6).

[Chemical formulae 4]

(4)

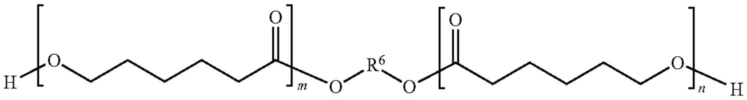

-continued (5)

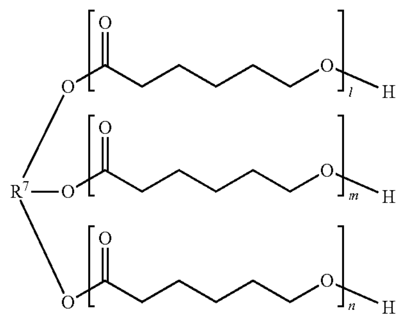

(6)

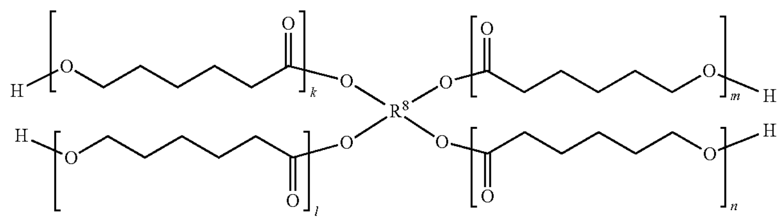

As a poly(ε-caprolactone)polyol, there may be used, for example, a polyaddition product prepared by adding lactone to an aliphatic polyhydric alcohol having 2 to 20 carbon atoms; in the above formulae, $R^6$ to $R^8$ represent residues of such aliphatic polyhydric alcohol having 2 to 20 carbon atoms, and k, l, m and n are integers satisfying $1 \leq k+1+m+n \leq 100$.

$R^6$ in the formula (4) represents an aliphatic group having 2 to 20 carbon atoms, which is an aliphatic hydrocarbon group that has 2 to 20 carbon atoms and may contain a hetero atom such as an oxygen atom; specifically, $R^6$ is a residue derived from the following aliphatic dihydric alcohols. Examples of such aliphatic dihydric alcohol include linear alcohols such as ethylene glycol, 1,3-propylene glycol, 1,4-butanediol, 1,5-pentanediol, 1,6-hexanediol, 1,7-heptanediol, 1,8-octanediol, 1,9-nonanediol, 1,10-dodecanediol, diethylene glycol, triethylene glycol, and tetraethylene glycol; branched alcohols such as 1,2-, 1,3- or 2,3-butanediol, 2-methyl-1,4-butanediol, neopentyl glycol, 2,2-diethyl-1,3-propanediol, 2-methyl-1,5-pentanediol, 3-methy 1-1,5-pentanediol, 2-methyl-1,6-hexanediol, 3-methyl-1,6-hexanediol, 2-methyl-1,7-heptanediol, 3-methyl-1,7-heptanediol, 4-methyl-1,7-heptanediol, 2-methyl-1,8-octanediol, 3-methyl-1,8-octanediol, and 4-methyloctanediol; and alicyclic alcohols such as 1,4-cyclohexanediol, 1,3-cyclohexanedimethanol, 1,4-cyclohexanediol, 1,3-cyclopentanediol, 1,4-cycloheptanediol, 2,5-bis(hydroxymethyl)-1,4-dioxane, 2,7-norbornanediol, tetrahydrofurandimethanol, 1,4-bis(hydroxyethoxy)cyclohexane, 1,4-bis(hydroxymethyl)cyclohexane, and 2,2-bis(4-hydroxycyclohexyl)propane. As a commercially available product of poly(ε-caprolactone)diol, there is known, for example, PLACCEL 205U [by DAICEL CORPORATION].

$R^7$ in the formula (5) represents an aliphatic group having 2 to 20 carbon atoms, which is an aliphatic hydrocarbon group that has 2 to 20 carbon atoms and may contain a hetero atom such as an oxygen atom; specifically, $R^7$ is a residue derived from the following aliphatic trihydric alcohols. Examples of such aliphatic trihydric alcohol include glycerin, trimethylolethane, and trimethylolpropane. As a commercially available product of poly(ε-caprolactone)triol, there is known, for example, PLACCEL 305 [by DAICEL CORPORATION].

$R^8$ in the formula (6) represents an aliphatic group having 2 to 20 carbon atoms, which is an aliphatic hydrocarbon group that has 2 to 20 carbon atoms and may contain a hetero atom such as an oxygen atom; specifically, $R^8$ is a residue derived from the following aliphatic tetrahydric alcohols. The aliphatic tetrahydric alcohol may for example be pentaerythritol. A commercially available product thereof may for example be PLACCEL 410 [by DAICEL CORPORATION].

As a production method of the component (A), there may be employed a method where a molecule having an aliphatic unsaturated group at one molecular end is to be introduced into the above-exemplified polyester, polyester copolymer or polyester polyol having a linear or branched structure, via ester bond, ether bond, urethane bond, urea bond, amide bond, sulfide bond or the like. Specifically, as a molecule that has an aliphatic unsaturated group at one molecular end and forms any of the above bonds, an acid halide or the like that is superior in stability and reaction rate of polyester at the time of reaction may be reacted with the aforesaid polylactone polyol or the like; an acid chloride is preferred in terms of availability and cost. Further, it is preferred that an aliphatic unsaturated group be present at a molecular end moiety, examples of which include an alkenyl group such as a vinyl group, an allyl group, a butenyl group, a pentenyl group and a hexenyl group; an alkynyl group such as an ethynyl group; and a cyclic unsaturated group such as a norbornene group and a dicyclopentadienyl group. An alkenyl group is preferred. As an acid chloride having an alkenyl group at a molecular end, there may be listed, for example, 4-pentenoyl chloride, 6-heptenoyl chloride, 8-nonenoyl chloride, and 10-undecenoyl chloride.

It is preferred that the component (A) be a liquid, more preferably have a weight-average molecular weight of 200 to 10,000 when measured by gel permeation chromatography (GPC). A weight-average molecular weight of 300 to 5,000 is even more preferred. A molecular weight smaller than 200 may lead to a poor degradability, and a molecular weight larger than 10,000 will make it difficult to prepare the rubber particles.

The component (B) which is the organohydrogenpolysiloxane having at least two silicon atom-bonded hydrogen atoms per molecule, may have a linear, cyclic or branched structure, of which a linear structure is preferred, and it is preferred that the component (B) have a structure expressed by the following formula (1).

In the formula (1), each $R^1$ independently represents a substituted or unsubstituted monovalent hydrocarbon group having 1 to 30 carbon atoms. Each $R^2$ independently represents a hydrogen atom, or a substituted or unsubstituted monovalent hydrocarbon group having 1 to 30 carbon atoms. m is a number satisfying $1 \le m \le 1{,}000$, preferably $1 \le m \le 500$; n is a number satisfying $0 \le n \le 1{,}000$, preferably $1 \le n \le 500$. When n=0, the two $R^2$s are hydrogen atoms; when neither of the two $R^2$s is a hydrogen atom, n is 2 or larger.

[Chemical formula 5]

(1)

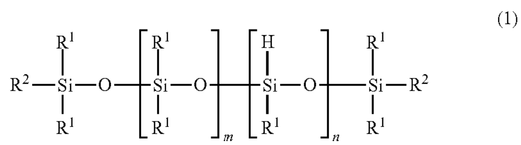

Examples of $R^1$ include alkyl groups such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, and a triacontyl group; aryl groups such as a phenyl group, a tolyl group, and a naphthyl group; aralkyl groups such as a benzyl group and a phenethyl group; cycloalkyl groups such as a cyclopentyl group, a cyclohexyl group, and a cycloheptyl group; and hydrocarbon groups obtained by substituting part of or all the carbon atom-bonded hydrogen atoms in any of these groups with atoms such as halogen atoms (fluorine atom, chlorine atom, bromine atom, iodine atom) and/or with substituent groups such as an acryloyloxy group, methacryloyloxy group, epoxy group, glycidoxy group and carboxyl group.

In the formula (1), $R^2$ represents a hydrogen atom, or a substituted or unsubstituted monovalent hydrocarbon group having 1 to 30 carbon atoms. As the substituted or unsubstituted monovalent hydrocarbon group having 1 to 30 carbon atoms, which is represented by $R^2$, there may be exemplified those identical to the above-listed examples of $R^1$.

It is yet preferred that the component (B) be a diphenylsiloxy unit-containing organohydrogenpolysiloxane represented by the following formula (2). In the formula (2), $R^1$ and $R^2$ are identical to those in the formula (1); each $R^3$ independently represents a substituted or unsubstituted monovalent hydrocarbon group having 1 to 30 carbon atoms, other than a phenyl group.

[Chemical formula 6]

(2)

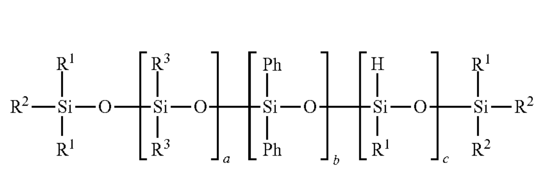

In the formula (2), examples of $R^3$ include alkyl groups such as a methyl group, an ethyl group, a propyl group, a butyl group, a pentyl group, a hexyl group, a heptyl group, an octyl group, a decyl group, an undecyl group, a dodecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, and a triacontyl group; aryl groups other than a phenyl group, such as a tolyl group and a naphthyl group; aralkyl groups such as a benzyl group and a phenethyl group; cycloalkyl groups such as a cyclopentyl group, a cyclohexyl group, and a cycloheptyl group; and hydrocarbon groups obtained by substituting part of or all the carbon atom-bonded hydrogen atoms in any of these groups with atoms such as halogen atoms (fluorine atom, chlorine atom, bromine atom, iodine atom) and/or with substituent groups such as an acryloyloxy group, methacryloyloxy group, epoxy group, glycidoxy group and carboxyl group.

In the formula (2), a, b and c satisfy $0 \le a \le 500$, $1 \le b \le 1{,}000$, $1 \le a+b \le 1{,}000$, and $0 \le c \le 1{,}000$; preferably $0 \le a \le 250$, $1 \le b \le 500$, and $1 \le c \le 500$. Here, when c=0, the two $R^2$s are both hydrogen atoms; when neither of the two $R^2$s is a hydrogen atom, c is 2 or larger.

As for (A) the polyester having at least two aliphatic unsaturated groups per molecule, and (B) the organohydrogenpolysiloxane having at least two silicon atom-bonded hydrogen atoms per molecule, more preferred is a composition where either the aliphatic unsaturated groups in the component (A) or the hydrogen atoms in the component (B) are present in a quantity of at least three. As for a compounding ratio between the components (A) and (B), preferred is a ratio at which the hydrosilyl groups in the component (B) are present in a quantity of 0.5 to 2.0 per 1 aliphatic unsaturated group in the component (A).

As a hydrosilylation catalyst for crosslinking the components (A) and (B), there may be listed, for example, a platinum-based catalyst, a rhodium-based catalyst and a palladium-based catalyst, of which a platinum-based catalyst is preferred. Specific examples of such platinum-based catalyst include elemental platinum (including platinum black), a platinum-supported carbon or silica, chloroplatinic acid, a platinum-olefin complex, a platinum-alcohol complex, a complex of platinum and vinyl group-containing siloxane, and a complex of chloroplatinic acid and vinyl group-containing siloxane. The platinum-based catalyst may be added in a catalytic amount of a hydrosilylation reaction catalyst. Specifically, the platinum-based catalyst is added in an amount of about 0.1 to 500 ppm, preferably about 0.1 to 200 ppm, more preferably about 0.5 to 100 ppm, in terms of mass of platinum in the catalyst. An amount smaller than 0.1 ppm will slow curing and make the catalyst more susceptible to catalyst poisoning. Meanwhile, an amount larger than 500 ppm will cause coloring of the rubber particles and is unfavorable on the economic front.

Production Method of Component (A)

As a production method of the component (A), there may be used, for example, the following method; however, the production method shall not be limited to the method described below. Here, an excessive amount of 2.2 to 8.0 mol, preferably 2.5 to 6.0 mol of a base for capturing hydrogen chloride generated is to be mixed with 1 mol of any of the polylactone polyol components of the formulae (4) to (6) or 1 mol of a polyester polyol component, and an excessive amount of 2.0 to 7.0 mol, preferably an amount of larger than 2.2 mol but not larger than 6.0 mol of the aforesaid acid chloride having an aliphatic unsaturated group at a molecular end is then delivered thereinto by drops to bring about a reaction for 30 min to 6 hours, preferably 1 to 2 hours while performing heating. After the reaction is over, the reaction product is subjected to an extraction, water washing and adsorption steps to have a by-product removed and the solvent distilled away, thus obtaining the component (A).

The base is added to capture hydrogen chloride generated by the reaction; and as such base, there may be used one that is not reactive with polylactone polyols, polyester polyols and acid chlorides. As such base, preferred is a tertiary amine, and more preferred is triethylamine.

In the extraction step, there may also be used a hydrophobic organic solvent to adjust the viscosity of the reaction product. There are no particular limitations on such hydrophobic organic solvent; toluene is preferred in terms of solubility or the like.

The adsorption step is a step to remove a hydrochloride of base that cannot be completely removed via the water washing step, and perform dewatering, decoloring and deodorizing. A known adsorbent may be used, and a number of adsorbents may be used in combination. As such adsorbent, preferred are a desiccant such as magnesium sulfate and sodium sulfate; an activated carbon; and the KYOWAAD series (by Kyowa Chemical Industry Co., Ltd.).

Production Method of Rubber Particles

The rubber particles of the present invention may for example be produced by a method having the following steps (i) to (iii).

(i)

Preparing an O/W type emulsion by adding a surfactant-containing water phase component to an oil phase component and performing stirring, the oil phase being comprised of (A) the polyester having at least two aliphatic unsaturated groups per molecule; and (B) the organohydrogenpolysiloxane having at least two silicon atom-bonded hydrogen atoms per molecule.

(ii)

Obtaining (C) a rubber particle water dispersion by curing the oil phase component comprised of the components (A) and (B) in the O/W type emulsion under the presence of the aforesaid hydrosilylation catalyst.

(iii)

Obtaining rubber particles by drying and removing water as a continuous phase of the rubber particle water dispersion.

Step (i)

There are no particular limitations on the surfactant used in the step (i); there may be used a non-ionic surfactant, an anionic surfactant, a cationic surfactant or an amphoteric surfactant. Any one kind of these surfactants may be used alone, or two or more kinds of them may be used in an appropriately combined manner.

Examples of the non-ionic surfactant used here include polyoxyethylene alkyl ether, polyoxyethylene poly oxypropylene alkyl ether, polyoxyethylene alkylphenyl ether, polyethylene glycol fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, propylene glycol fatty acid ester, polyoxyethylene castor oil, polyoxyethylene hydrogenated castor oil, polyoxyethylene hydrogenated castor oil fatty acid ester, polyoxyethylene alkylamine, polyoxyethylene fatty acid amide, polyoxyethylene-modified organopolysiloxane, and polyoxyethylene-polyoxypropylene-modified organopolysiloxane.

Examples of the anionic surfactant include an alkyl sulfate ester salt such as sodium lauryl sulfate, polyoxyethylene alkyl ether sulfate ester salt, polyoxyethylene alkylphenyl ether sulfate ester salt, sulfate ester salt of aliphatic alkylolamide, alkylbenzene sulfonate salt, polyoxyethylene alkylphenyl ether sulfonate salt, alkyldiphenyl ether disulfonate salt, alkanesulfonate salt, N-acyltaurate salt, dialkyl sulfosuccinate salt, monoalkyl sulfosuccinate salt, polyoxyethylene alkyl ether sulfosuccinate salt, fatty acid salt, polyoxyethylene alkyl ether carboxylate salt, N-acylamino acid salt, monoalkyl phosphate ester salt, dialkyl phosphate ester salt, and polyoxyethylene alkyl ether phosphate ester salt.

Examples of the cationic surfactant include an alkyltrimethylammonium salt, dialkyldimethylammonium salt, polyoxyethylene alkyldimethylammonium salt, dipolyoxyethylene alkylmethylammonium salt, tripolyoxyethylene alkylammonium salt, alkylbenzyl dimethylammonium salt, alkylpyridium salt, monoalkylamine salt, and monoalkyl amidoamine salt.

Examples of the amphoteric surfactant include alkyldimethylamine oxide, alkyldimethylcarboxybetaine, alkylamidopropyl dimethylcarboxybetaine, alkylhydroxysulfobetaine, and alkylcarboxymethylhydroxyethyl imidazolinium betaine.

It is preferred that the surfactant be a non-ionic surfactant due to the fact that the aforementioned curable liquid silicone composition can be emulsified with a small amount of such surfactant, and that fine particles can be obtained thereby.

The surfactant is preferably added in an amount of 0.01 to 20 parts by mass, more preferably 0.05 to 10 parts by mass, per 100 parts by mass of the emulsion. An amount smaller than 0.01 parts by mass will incur problems such as one that emulsification is impossible, and one that fine particles cannot be obtained. An amount larger than 20 parts by mass will make it difficult to coat the rubber particles with polyorganosilsesquioxane or silica in a later-described production method of composite particles.

Further, the oil phase components in this emulsion which are (A) the polyester having at least two aliphatic unsaturated groups per molecule and (B) the organohydrogenpolysiloxane having at least two silicon atom-bonded hydrogen atoms per molecule, are preferably contained in an amount of 1 to 80 parts by mass, more preferably 10 to 60 parts by mass, per 100 parts by mass of the emulsion. An amount smaller than 1 part by mass is unfavorable in terms of efficiency; an amount larger than 80 parts by mass will make it difficult to obtain the dispersion as a rubber particle water dispersion.

Emulsification may be performed using a known emulsifying disperser; as a general emulsifying disperser, there may be listed, for example, a high-speed rotary shear-type mixer such as a homomixer; a high-speed centrifugal radiation-type mixer such as HOMODISPER; a high-pressure injection-type emulsifying disperser such as a homogenizer; a colloid mill; and an ultrasonic emulsifying machine.

Step (ii)

The rubber particle dispersion can be obtained by curing the oil phase in the emulsion thus prepared, under the presence of the aforesaid hydrosilylation catalyst. This hydrosilylation catalyst may be added to the oil phase either before or after preparing the emulsion. If adding the hydrosilylation catalyst after preparing the emulsion, there is a possibility that the hydrosilylation catalyst may not disperse; in such case, the hydrosilylation catalyst may be mixed with a surfactant before addition. Hydrosilylation may be performed at room temperature; if the reaction cannot be completed, it may be performed while conducting heating at a temperature lower than 100° C. A hydrosilylation reaction time is appropriately selected. This method allows there to be obtained a water dispersion of rubber particles having a volume average particle size of 0.1 to 50 μm.

Step (iii)

Rubber particles can be obtained by drying and removing water as a continuous phase from the obtained rubber particle water dispersion. The drying and removal of water from the rubber particle water dispersion may for example be carried out by performing heating under a normal or reduced pressure. Specifically, there may be listed, for example, a method where water is removed by leaving the dispersion to stand still under a heated condition; a method where water is removed while stirring and fluidizing the dispersion under a heated condition; a method where the dispersion is sprayed and dispersed into a hot air flow such as that generated by a spray dryer; and a method where a fluid heat medium is utilized. Here, as a pretreatment of this operation, the dispersion may be condensed by a method such as thermal dehydration, filtration separation or decantation; if necessary, the dispersion may also be washed with water and/or an alcohol.

Composite Particles

There are no particular limitations on the shape of the polyorganosilsesquioxane or silica coating the surfaces of the composite particles; in the case of the later-described production method, it has a granular shape. A smaller particle size thereof is preferred; specifically, a particle size of not larger than 500 nm is preferred. While the organosilsesquioxane or silica may coat part of or the entire surface of each rubber particle, it is preferred that the rubber particle be coated in a substantially solid manner throughout the entire surface thereof. Here, the coating condition, shape and particle size can be identified by observing the particle surface via an electron microscope.

There are no particular limitations on the amount of the polyorganosilsesquioxane or silica coating the particle surfaces; it is preferred that the polyorganosilsesquioxane or silica be present at a ratio of 0.5 to 200 parts by mass, more preferably 1 to 50 parts by mass, per 100 parts by mass of the rubber particles.

Production Method of Composite Particles

The composite particles of the present invention are obtained by adding (F) one kind selected from an organotrialkoxysilane or tetraalkoxysilane represented by the following general formula (3) and a hydrolysate thereof to a liquid containing (C) a rubber particle water dispersion;

(D) water (optional); and (E) an alkaline substance, whereby a hydrolytic condensation reaction is caused to allow the surfaces of the rubber particles to be coated with polyorganosilsesquioxane or silica.

[Chemical formula 7]

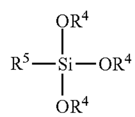

(3)

In the formula (3), each $R^4$ independently represents a monovalent hydrocarbon group having 1 to 6 carbon atoms; $R^5$ represents a substituted or unsubstituted monovalent hydrocarbon group having 1 to 20 carbon atoms, or $—OR^4$.

That is, the composite particles of the present invention can be produced by a method having the following steps (i) to (v).

(i) A step of obtaining an O/W type emulsion by adding a surfactant-containing water phase component to an oil phase component and performing stirring, the oil phase component being comprised of (A) the polyester having at least two aliphatic unsaturated groups per molecule; and (B) the organohydrogenpolysiloxane having at least two silicon atom-bonded hydrogen atoms per molecule.

(ii) A step of obtaining (C) a rubber particle water dispersion by curing the oil phase component comprised of the components (A) and (B) in the emulsion via a hydrosilylation reaction under the presence of a hydrosilylation reactive catalyst.

(iii') A step of adding (E) an alkaline substance to (C) the rubber particle water dispersion obtained in the step (ii).

(iv) A step of obtaining a composite particle water dispersion by adding (F) one kind selected from the organotrialkoxysilane or tetraalkoxysilane represented by the general formula (3) and a hydrolysate thereof to the water dispersion obtained in the step (iii') which is the rubber particle water dispersion to which the alkaline substance has been added, whereby a condensation reaction is caused to allow the surfaces of the rubber particles to be coated with polyorganosilsesquioxane or silica.

(v) A step of obtaining composite particles by drying and removing water as a continuous phase from the composite particle water dispersion obtained in the step (iv).

The steps (i) and (ii) in the production method of the composite particles are similar to those of the production method of the rubber particles. Further, in the step (iii'), (D) water may be added as an optional component.

Step (iii')

(D) Water

There are no particular limitations on water, a purified water or the like may be used, and it may include water in the rubber particle water dispersion obtained in the step (ii) as well as water that is added as necessary.

(E) Alkaline Substance

The alkaline substance may be any alkaline substance so long as it functions as a catalyst for the hydrolytic condensation reaction of the organotrialkoxysilane or tetraalkoxysilane. Specific examples thereof include alkali metal hydroxides such as potassium hydroxide, sodium hydroxide and lithium hydroxide; alkaline-earth metal hydroxides such as calcium hydroxide and barium hydroxide; alkali metal carbonates such as potassium carbonate and sodium carbonate; amines such as ammonia, monomethylamine and dimethylamine; and quaternary ammonium hydroxides such as tetramethylammonium hydroxide. Here, more preferred is ammonia which is superior in water solubility and catalytic activity, and is easily removable via volatilization; there may be used an ammonia water solution that is generally commercially available.

It is preferred that the component (E) be added in an amount at which the pH of the liquid containing (C) to (E) at 25° C. becomes 9.0 to 13.0, more preferably 10.0 to 12.5. A pH lower than 10.0 will result in an insufficient progress of the hydrolytic condensation reaction of the organotrialkoxysilane or tetraalkoxysilane; a pH higher than 13.0 will result in a higher hydrolyzation speed such that the hydrolytic condensation reaction will occur in parts other than the surfaces of the rubber particles, whereby a low coatability will be observed.

When adding the component (F), there may also be optionally added (G) at least one kind selected from a cationic surfactant and a cationic water-soluble polymer compound.

Cationic surfactants and cationic water-soluble polymer compounds are capable of yielding polyorganosilsesquioxane or silica by promoting the condensation reaction of the hydrolyzed organotrialkoxysilane and tetraalkoxysilane. Further, the polyorganosilsesquioxane or silica yielded may be allowed to adsorb to the surfaces of the rubber particles.

Examples of a cationic surfactant include an alkyltrimethylammonium salt, a dialkyldimethylammonium salt, a polyoxyethylene alkyl dimethyl ammonium salt, a dipolyoxyethylene alkyl methyl ammonium salt, a tripolyoxyethylene alkyl ammonium salt, an alkylbenzyldimethylammonium salt, an alkylpyridium salt, a monoalkylamine salt, and a monoalkylamidoamine salt. Among these examples, preferred is an alkyltrimethylammonium salt; more preferred are a lauryltrimethylammonium salt and a cetyltrimethylammonium salt.

Examples of a cationic water-soluble polymer compound include a polymer of dimethyldiallylammonium chloride, a polymer of vinylimidazoline, a polymer of methylvinylimidazolium chloride, a polymer of ethyltrimethylammonium acrylate chloride, a polymer of ethyltrimethylammonium methacrylate, a polymer of acrylamidopropyltrimethylammonium chloride, a polymer of methacrylamidopropyltrimethylammonium chloride, an epichlorohydrin-dimethylamine polymer, a polymer of ethyleneimine, a quaternized product of an ethyleneimine polymer, a polymer of an allylamine hydrochloride salt, polylysine, a cationic starch, a cationic cellulose, chitosan, and derivatives thereof obtained by for example copolymerizing these compounds with monomers having non-ionic and/or anionic groups. Among these examples, a polymer of dimethyldiallylammonium chloride is preferred.

It is preferred that the component (G) be added in an amount of 0.001 to 2 parts by mass, more preferably 0.005 to 1 part by mass, per 100 parts by mass of the water in the liquid containing (C) to (E). An added amount larger than 2 parts by mass may generate polyorganosilsesquioxane or silica failing to coat the surfaces of the rubber particles.

(F) One Kind Selected from the Organotrialkoxysilane or Tetraalkoxysilane Represented by the General Formula (3) and a Hydrolysate Thereof The polyorganosilsesquioxane or silica coating the rubber particles is formed by adding to the rubber particles one kind selected from the organotrialkoxysilane or tetraalkoxysilane represented by the general formula (3) and a hydrolysate thereof. In this formula, $R^4$ represents a monovalent hydrocarbon group having 1 to 6 carbon atoms, examples of which may include a methyl group, an ethyl group, a propyl group and a butyl group. $R^5$ in the formula represents a substituted or unsubstituted monovalent hydrocarbon group having 1 to 20 carbon atoms, or —$OR^4$. Examples of the substituted or unsubstituted monovalent hydrocarbon group having 1 to 20 carbon atoms include alkyl groups such as a methyl group, an ethyl group, a propyl group and a butyl group; aryl groups such as a phenyl group and a tolyl group; alkenyl groups such as a vinyl group and an allyl group; aralkyl groups such as a β-phenylethyl group a β-phenylpropyl group; monovalent halogenated hydrocarbon groups such as a chloromethyl group and a 3,3,3-trifluoropropyl group; and groups obtained by substituting these monovalent hydrocarbon groups with an epoxy group, amino group, mercapto group, acryloxy group, methacryloxy group or the like.

When $R^5$ is a substituted or unsubstituted monovalent hydrocarbon group having 1 to 20 carbon atoms, the rubber particles will be coated with polyorganosilsesquioxane; when $R^5$ is —$OR^4$, the rubber particles will be coated with silica.

Specific examples of the organotrialkoxysilane and tetraalkoxysilane used for coating may include methyltrimethoxysilane, methyltriethoxysilane, methyltripropoxysilane, methyltributoxysilane, ethyltrimethoxysilane, propyltrimethoxysilane, butyltrimethoxysilane, N-(β-aminoethyl)-γ-aminopropyltrimethoxysilane, γ-glycidoxypropyltrimethoxysilane, vinyltrimethoxysilane, phenyltrimethoxysilane, γ-methacryloxypropyltrimethoxysilane, γ-mercaptopropyltrimethoxysilane, 3,3,3-trifluoropropyltrimethoxysane, 3,3,4,4,5,5,6,6,6-nonafluorohexyltrimethoxysilane, 3,3,4,4,5,5,6,6,7,7,8,8,9,9,10,10,10-heptadecafluorodecyltrimethoxysilane, tetramethoxysilane, and tetraethoxysilane.

It is preferred that the component (F) be added in an amount of not larger than 20 parts by mass per 100 parts by mass of the water in the liquid containing (C) to (E). When this amount is larger than 20 parts by mass, a block object(s) may occur.

Step (iv)

By adding (F) one kind selected from the organotrialkoxysilane or tetraalkoxysilane and a hydrolysate thereof to the liquid containing (C) to (E) and (G) so as to hydrolyze and condense the organotrialkoxysilane or tetraalkoxysilane, the surfaces of the rubber particles will be coated with the polyorganosilsesquioxane or silica. Specifically, hydrolyzation and condensation take place as a result of adding (F) one kind selected from the organotrialkoxysilane or tetraalkoxysilane and a hydrolysate thereof to the water solution prepared by dissolving (E) the alkaline substance and (G) at least one kind selected from a cationic surfactant and a cationic water-soluble polymer compound (optional) into (C) the rubber particle water dispersion and (D) water (optional). The condensation product i.e. polyorganosilsesquioxane or silica shall coat the surfaces of the rubber particles to form the composite particles.

It is preferred that addition of the organotrialkoxysilane, the tetraalkoxysilane and a hydrolysate thereof be carried out while performing stirring using a normal stirrer such as that equipped with propeller blades, flat plate blades or the like. The organotrialkoxysilane, the tetraalkoxysilane and a hydrolysate thereof are preferably gradually added over time; a drop time is preferably 1 min to 6 hours, more preferably 10 min to 3 hours.

The temperature in the system while performing dropping is preferably 0 to 60° C., more preferably 0 to 40° C. When the temperature is within these ranges, the surfaces of the rubber particles will be able to be coated with polyorganosilsesquioxane and silica.

Step (v)

After the hydrolyzation and condensation reaction was over, the composite particles can be obtained by drying and removing water as a continuous phase from the obtained composite particle water dispersion of the present invention. The removal of water may for example be carried out by heating the reacted water dispersion under a normal or reduced pressure. Specifically, there may be listed, for example, a method where water is removed by leaving the dispersion to stand still under a heated condition; a method where water is removed while stirring and fluidizing the dispersion under a heated condition; a method where the dispersion is sprayed and dispersed into a hot air flow such as that generated by a spray dryer; and a method where a fluid heat medium is utilized. Here, as a pretreatment of this operation, the dispersion may be condensed by a method such as thermal dehydration, filtration separation, centrifugal separation or decantation; if necessary, the dispersion may also be washed with water and/or an alcohol.

If the product obtained by drying and removing water from the reacted water dispersion is agglomerated, the composite particles with the rubber particle surfaces being coated with polyorganosilsesquioxane and silica can be obtained by crushing this product with a crusher such as a jet mill, a ball mill or a hammer mill.

be 1.1 chlorine atoms of an acid chloride per 1 hydroxyl group of the poly(ε-caprolactone)diol) of an undecenoic acid chloride, after which aging was performed for two hours. After aging, 200 g of water and 100 g of toluene were added, and the water phase was then moved to a separating funnel for extraction with 100 g of toluene. After extraction, the oil phase was washed with 450 g of water once and with 450 g of a saturated salt water twice, followed by adding 10 g of magnesium sulfate, 10 g of an activated carbon and 10 g of KYOWAAD 700 (by Kyowa Chemical Industry Co., Ltd.) to then perform shaking for two hours. After shaking, the magnesium sulfate, activated carbon and KYOWAAD 700 were eliminated via pressure filtration, and the solvent was distilled away at 60° C. and 10 mm Hg or lower, thereby obtaining an alkenyl group-containing poly-ε-caprolactone 1 (following formula (7)).

[Chemical formula 8]

(7)

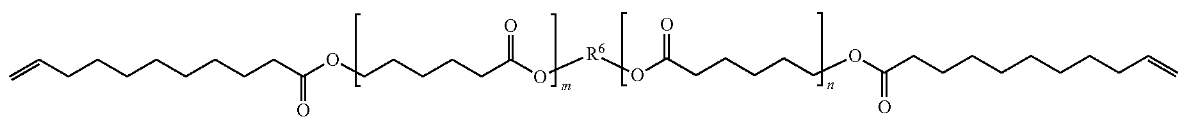

(R^6 represents an aliphatic group; 2≤m+n≤5; weight-average molecular weight: 862)

WORKING EXAMPLES

The present invention is described in greater detail hereunder with reference to working and comparative examples; the invention shall not be limited to the following working examples. Further, in these examples, a dynamic viscosity is a value measured at 25° C.; "%" indicating concentrations and content rates refers to "% by mass". A penetration degree of a rubber cured product is a value measured in accordance with the standards of the Society of Rubber Science and Technology, Japan (SRIS). The molecular weight of the component (A) is a weight-average molecular weight measured by GPC under the following conditions, with polystyrene being a reference substance.

Measurement Conditions

Developing solvent: Tetrahydrofuran (THF)
Flow rate: 0.60 mL/min
Detector: Differential refractive index detector (RI)
Column: TSK Guardcolumn Super H-H
TSK gel Super HM-N
TSK gel Super H2500
(All manufactured by Tosoh Corporation)
Column temperature: 40° C.
Sample injection volume: 50 μL (THF solution with a concentration of 0.5% by mass)

Working Example 1

Synthesis of Alkenyl Group-Containing poly-ε-caprolactone 1

Here, 200 g of a poly(ε-caprolactone)diol (PLACCEL 205U by DAICEL CORPORATION, molecular weight 530, hydroxyl value 212.4 mg/g), 200 g of toluene and 95.8 g of triethylamine were added to a 1 L glass flask equipped with a stirrer, a dropping funnel, a thermometer and a cooling pipe, and mixed together at an adjusted temperature of 55° C., followed by using the dropping funnel to deliver thereinto by drops 168.9 g (an added amount at which there will

[Production of Rubber Particles]

Here, 171 g of the alkenyl group-containing poly-ε-caprolactone 1 synthesized and 83.46 g (an added amount at which there will be 1.1 hydrosilyl groups per 1 vinyl group) of a phenyl hydrogen polysiloxane represented by the following formula (8) and having a dynamic viscosity of 23 $mm^2/s$, were put into a 1 L container, followed by using a homomixer to stir and dissolve them at 1,500 rpm. Next, as a result of adding 1.35 g of polyoxyethylene lauryl ether and 31.5 g of water, and then using a homomixer to perform stirring at 5,000 rpm, an O/W type emulsion was obtained and an increase in viscosity was observed, after which stirring was further continued for another 10 min. Next, while performing stirring at 1,500 rpm, 258.54 g of water was used to dilute the emulsion to obtain a white emulsion.

[Chemical formula 9]

(8)

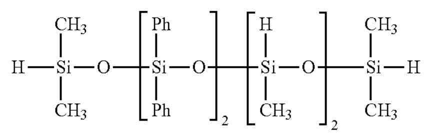

This emulsion was then moved to a 1 L glass flask equipped with a stirrer employing anchor-shaped stirring blades, and had its temperature adjusted to 15 to 20° C., followed by delivering thereinto by drops, while performing stirring, a mixed solution of 1 g of an isododecane solution of a complex of platinum and vinyl group-containing disiloxane (platinum content 0.5%) and 0.68 g of polyoxyethylene lauryl ether, where stirring was performed for 30 min to 1 hour. Next, stirring was performed for two days with the temperature being adjusted to 40° C., thus obtaining a rubber particle water dispersion.

As a result of using an optical microscope to observe the shape of the rubber particles in the water dispersion obtained, it was confirmed that the rubber particles had a spherical shape; and as a result of measuring the volume average particle size thereof by an electrical resistivity method-particle size distribution measurement device (Multisizer 3 by Beckman Coulter Inc.), it was confirmed that the rubber particles had a volume average particle size of 5 μm.

After drying the water in the obtained rubber particle water dispersion with a spray dryer whose inlet temperature was set to 150° C. and whose outlet temperature was set to 80° C., there were obtained white to light yellow powdery rubber particles.

Further, the hardness of the rubber making up the rubber particles was measured as follows. The alkenyl group-containing poly-ε-caprolactone 1, the phenyl hydrogen polysiloxane represented by the formula (8), and the isododecane solution of the complex of platinum and vinyl group-containing disiloxane (platinum content 0.5%), were mixed at the above ratio and then poured into an aluminum petri dish so that the mixture would have a thickness of 10 mm therein. After leaving the same at 40° C. for two days, there was obtained a non-sticky (non-tacky) planar rubber. The hardness thereof was 63 as a result of conducting measurement using an Asker C durometer.

Working Example 2

[Production of Composite Particles]

A rubber particle water dispersion was obtained in a similar manner as the working example 1. Here, 357 g of the rubber particle water dispersion obtained was moved to a 2 L glass flask equipped with a stirrer employing anchor-shaped stirring blades, where further added thereto were 602.5 g of water, 19 g of a 28% ammonia water solution and 1 g of a 40% dimethyldiallylammonium chloride polymer water solution (ME Polymer H40W by TOHO Chemical Industry Co., Ltd.). The pH of the solution at that time was 11.3. After adjusting the temperature to 5 to 10° C., 25 min were spent in delivering thereinto by drops 20.5 g (an amount at which polymethylsilsesquioxane after the hydrolyzation and condensation reaction will be in an amount of 6.7 parts by mass per 100 parts by mass of the rubber particles) of methyltrimethoxysilane, during which the temperature of the solution was maintained at 5 to 10° C., and after which stirring was continued for another hour. Next, the solution was heated to 55 to 60° C. and stirred for an hour while maintaining such temperature, thereby completing the hydrolyzation and condensation reaction of methyltrimethoxysilane.

The solution prepared by hydrolyzing and condensing methyltrimethoxysilane in the rubber particle water dispersion was dehydrated to a water content of about 30%, using a pressure filtration device. The dehydration product was then moved to a 2 L glass flask equipped with a stirrer employing anchor-shaped stirring blades, followed by adding 1,000 g of water thereto to perform stirring for 30 min, after which dehydration was performed using the pressure filtration device. The dehydration product was again moved to the 2 L glass flask equipped with the stirrer employing the anchor-shaped stirring blades, followed by adding 1,000 g of water thereto to perform stirring for 30 min, after which dehydration was performed using the pressure filtration device. The dehydration product was dried at 105° C. in a hot air flow dryer, and the dried product was then crushed by a jet mill to obtain particles with fluidity.

As a result of observing the obtained particles with an electron microscope, it was confirmed that the particles were composite particles with the rubber particles being coated with a granular polyorganosilsesquioxane throughout the entire surfaces thereof (polyorganosilsesquioxane-coated rubber particles).

The composite particles obtained were then dispersed in water with a surfactant; and as a result of conducting measurement using the electrical resistivity method-particle size distribution measurement device (Multisizer 3 by Beckman Coulter Inc.), it was confirmed that the particle size distribution was at the same level as the above rubber particle water dispersion, and that the volume average particle size was 5 μm.

Working Example 3

A rubber particle water dispersion was obtained in a similar manner as the working example 1. Here, 265 g of the rubber particle water dispersion obtained was moved to a 2 L glass flask equipped with a stirrer employing anchor-shaped stirring blades, where further added thereto were 651.1 g of water, 2.2 g of a 2.8% ammonia water solution and 12 g (an amount at which lauryltrimethylammonium chloride will be in an amount of 0.44 parts per 100 parts by mass of water) of a 30% lauryltrimethylammonium chloride water solution (CATION BB by NOF CORPORATION). The pH at that time was 10.4. After adjusting the temperature to 5 to 10° C., 60 min were spent in delivering thereinto by drops 70.7 g (an amount at which silica after the hydrolyzation and condensation reaction will be in an amount of 27 parts by mass per 100 parts by mass of the rubber particles) of tetramethoxysilane, during which the temperature of the solution was maintained at 5 to 10° C., and after which stirring was performed for another three hours. Next, the solution was heated to 70 to 75° C. and stirred for an hour while maintaining such temperature, thereby completing the hydrolyzation and condensation reaction of tetramethoxysilane.

The composite particles obtained were then dispersed in water with a surfactant; and as a result of conducting measurement using the electrical resistivity method-particle size distribution measurement device (Multisizer 3 by Beckman Coulter Inc.), it was confirmed that the particle size distribution was at the same level as the above rubber particle water dispersion, and that the volume average particle size was 5 μm.

Working Example 4

Synthesis of Alkenyl Group-Containing poly-ε-caprolactone 2

Synthesis was conducted in a similar manner as the working example 1, except that 200 g of a poly(ε-caprolactone)tetraol (PLACCEL 410 by DAICEL CORPORATION, molecular weight 1,030, hydroxyl value 216.7 mg/g) was used instead of 200 g of the poly(ε-caprolactone)diol (PLACCEL 205U by DAICEL CORPORATION), the amount of triethylamine was changed from 95.8 g to 98.4 g, and the amount of the undecenoic acid chloride was changed from 168.9 g to 173.5 g (an added amount at which there will be 1.1 acid chlorides per 1 hydroxyl group). As a result, an alkenyl group-containing poly-ε-caprolactone 2 (weight-average molecular weight: 1,698) was obtained.

[Chemical formula 10]

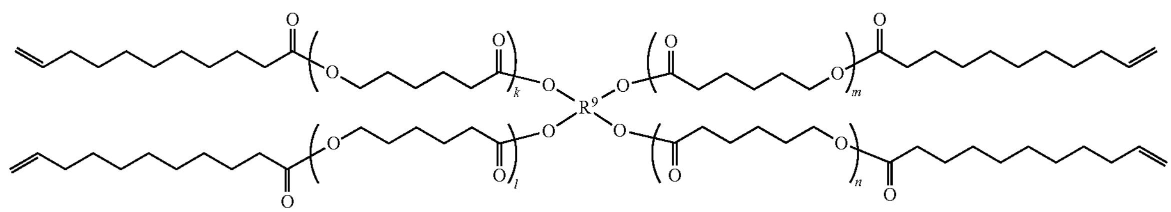

(9)

($R^9$ represents an aliphatic group; $4 \le k+l+m+n \le 9$; weight-average molecular weight: 1,698)

[Production of Rubber Particles]

A rubber particle water dispersion was obtained in a similar manner as the working example 1, except that 170 g of the alkenyl group-containing poly-ε-caprolactone 2 was used instead of 171 g of the alkenyl group-containing poly-ε-caprolactone 1, and that there were used 85.32 g (an added amount at which there will be 1.1 hydrosilyl groups per 1 vinyl group) of the phenyl hydrogen polysiloxane represented by the formula (8) and having the dynamic viscosity of 23 $mm^2/s$. As a result of using an optical microscope to observe the shape of the rubber particles in the water dispersion obtained, it was confirmed that the rubber particles had a spherical shape; and as a result of measuring the volume average particle size thereof by the electrical resistivity method-particle size distribution measurement device (Multisizer 3 by Beckman Coulter Inc.), it was confirmed that the rubber particles had a volume average particle size of 5 μm. As is the case with the working example 1, after eliminating water with a spray dryer, there was obtained a white to light yellow powder. Further, as a result of measuring the hardness of the rubber making up the rubber particles in a similar manner as the working example 1, it was confirmed that the hardness of such rubber was 82.

Working Example 5

In a similar manner as the working example 2, polyorganosilsesquioxane-coated composite particles were obtained from the rubber particle water dispersion obtained in the working example 4. The composite particles obtained were then dispersed in water with a surfactant; and as a result of conducting measurement using the electrical resistivity method-particle size distribution measurement device (Multisizer 3 by Beckman Coulter Inc.), it was confirmed that the particle size distribution was at the same level as the above rubber particle water dispersion, and that the volume average particle size was 5 μm.

Working Example 6

Using the rubber particle water dispersion obtained in the working example 4, silica-coated composite particles were obtained in a similar manner as the working example 3. The composite particles obtained were then dispersed in water with a surfactant; and as a result of conducting measurement using the electrical resistivity method-particle size distribution measurement device (Multisizer 3 by Beckman Coulter Inc.), it was confirmed that the particle size distribution was at the same level as the above rubber particle water dispersion, and that the volume average particle size was 5 μm. As a result of observing these particles with an electron microscope, it was confirmed that the particles were composite particles with the surfaces of the rubber particles being coated with a granular silica.

Comparative Example 1

[Production of Planar Silicone Rubber]

Here, 25 g of a methylvinylpolysiloxane represented by the following formula (10) and having a dynamic viscosity of 600 $mm^2/s$, and 1 g (an added amount at which there will be 1.1 hydrosilyl groups per 1 vinyl group) of a methyl hydrogen polysiloxane represented by the following formula (11) and having a dynamic viscosity of 27 $mm^2/s$ were put into a 100 mL container, and then stirred and dissolved. Next, 0.06 g of the isododecane solution of the complex of platinum and vinyl group-containing disiloxane (platinum content 0.5%) was added thereto to perform stirring, after which the mixture was poured into an aluminum petri dish so that it would have a thickness of 10 mm therein. After leaving the same at 40° C. for two days, there was obtained a planar rubber of a rubber composition of silicone particles. As a result of measuring the rubber hardness in a similar manner as the working example 1, it was confirmed that the hardness of this rubber was 60.

[Chemical formulae 11]

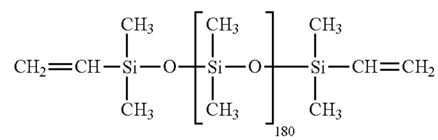

(10)

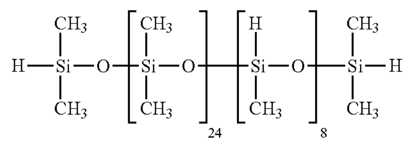

(11)

[Evaluation on Hydrolyzability of Rubber (Measurement of Planar Rubber Hardness Over Time)]

Hydrolyzability was evaluated by the following method, with regard to the planar rubber (rubber hardness: 63) that was obtained in the working example 1 and was comprised of the alkenyl group-containing poly-ε-caprolactone 1 and the phenyl hydrogen polysiloxane represented by the formula (8); the planar rubber (rubber hardness: 82) that was obtained in the working example 4 and was comprised of the alkenyl group-containing poly-ε-caprolactone 2 and the phenyl hydrogen polysiloxane represented by the formula (8); and the planar rubber (rubber hardness: 60) that was obtained in the comparative example 1 and was comprised of the methylvinylpolysiloxane represented by the formula (10) and the methyl hydrogen polysiloxane represented by the formula (11).

The three kinds of planar rubber samples were placed and left to stand still in a thermo-hygrostat of a temperature of 70° C. and a humidity of 90% (model IW222 by Yamato Scientific Co., Ltd.), and changes in rubber hardness were measured on a day-to-day basis.

Further, the planar rubber (rubber hardness: 63) obtained in the working example 1 was left to stand still in a dryer of a temperature of 70° C. (model DNE601 by Yamato Scientific Co., Ltd.) as well as in an environment of room temperature and a humidity of up to 65% (simulating a usage environment), where changes in rubber hardness were measured on a day-to-day basis.

TABLE 1

| | Rubber hardness (AskerC) | | | | | | |
|---|---|---|---|---|---|---|---|
| | At the start | 15 days later | 30 days later | 45 days later | 60 days later | 75 days later | 95 days later |
| Working example 1 Rubber sample Thermo-hygrostat | 63 | 58 | 35 | Liquefied | Liquefied | Liquefied | — |
| Working example 4 Rubber sample Thermo-hygrostat | 82 | 82 | 82 | 73 | 56 | 25 | Liquefied |
| Comparative example 1 Rubber sample Thermo-hygrostat | 60 | 60 | 60 | 60 | 60 | 60 | 60 |
| Working example 1 Rubber sample Dryer | 63 | 70 | 70 | 70 | 70 | 70 | 70 |
| Working example 1 Rubber sample Room temperature, Humidity up to 65% | 63 | 63 | 63 | 63 | 63 | 63 | 63 |

The planar rubber samples of the working examples 1 and 4 that were left to stand still in the thermo-hygrostat are assumed to have a degradability as they each had a structure where the alkenyl group-containing poly-ε-caprolactone and the organohydrogenpolysiloxane having the silicon atom-bonded hydrogen atoms were crosslinked under the presence of the hydrosilylation catalyst, and each exhibited a decrease in rubber hardness in the high-temperature and humidity environment of temperature 70° C., humidity 90%. In contrast, the planar rubber sample of the comparative example 1 is assumed to have no degradability as the ingredients thereof making up the rubber do not include one having a hydrolyzable functional group(s), such as polyester, and the rubber hardness thereof was constant even in the high-temperature and humidity environment. As for the planar rubber sample of the working example 1 that was left to stand still in the dryer of 70° C., while there was observed an increase in rubber hardness that was assumed to have been associated with a slight progression of hardening due to the heat, no decrease in rubber hardness was observed, from which it can be assumed that degradation would not occur unless under the presence of water. As for the planar rubber sample of the working example 1 that was left to stand still in the environment of room temperature and humidity up to 65%, simulating a usage environment, no decrease in rubber hardness was observed for a measurement period of 95 days, from which it can be assumed that the sample was stable in the actual usage environment for such measurement period.

The invention claimed is:

1. Rubber particles comprised of a copolymer having a polyester structure and an organopolysiloxane structure, wherein the copolymer is a hydrosilylation crosslinked product of:

(A) a polyester having at least two aliphatic unsaturated groups per molecule, which is a component with molecular chain ends of a poly(ε-caprolactone) polyol being substituted with aliphatic unsaturated groups; and (B) an organohydrogenpolysiloxane having at least two silicon atom-bonded hydrogen atoms per molecule, provided that excluded is a combination where there are two said aliphatic unsaturated groups per molecule of the component (A) and there are two said silicon atom-bonded hydrogen atoms per molecule of the component (B), wherein the rubber particles have a spherical shape and a volume average particle size of 0.1 to 50 μm, and wherein the rubber particles have a rubber hardness of 20 to 85 when measured by ASKER Durometer Type C.

2. The rubber particles according to claim 1, wherein the component (B) is an organohydrogenpolysiloxane having at least two silicon atom-bonded hydrogen atoms per molecule, which is represented by the following general formula (1):

(1)

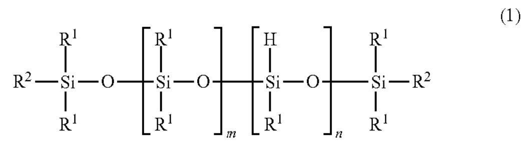

wherein each $R^1$ independently represents a substituted or unsubstituted monovalent hydrocarbon group having 1 to 30 carbon atoms; each $R^2$ independently represents a hydrogen atom, or a substituted or unsubstituted monovalent hydrocarbon group having 1 to 30 carbon atoms; m satisfies $1 \leq m \leq 1{,}000$; n satisfies $0 \leq n \leq 1{,}000$; provided that when n=0, the two $R^2$s are both hydrogen atoms, and that when neither of the two $R^2$s is a hydrogen atom, n is 2 or larger.

3. The rubber particles according to claim 2, wherein the component (B) is an organohydrogenpolysiloxane having at least two silicon atom-bonded hydrogen atoms per molecule, which is represented by the following general formula (2):

(2)

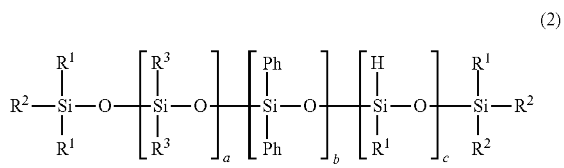

wherein $R^3$ represents a substituted or unsubstituted monovalent hydrocarbon group having 1 to 30 carbon atoms, other than a phenyl group; a, b and c satisfy 0≤a≤500, 1_b≤1,000, 1≤a+b≤1,000, and 0≤c≤1,000; provided that when c=0, the two $R^2$s are both hydrogen atoms, and that when neither of the two $R^2$s is a hydrogen atom, c is 2 or larger.

4. Composite particles with the surfaces of the rubber particles according to claim 1 being coated with polyorganosilsesquioxane or silica.

5. A method for producing the rubber particles according to claim 1, comprising:

(i) a step of obtaining an O/W type emulsion by adding, for emulsification, a surfactant-containing water phase component to an oil phase component comprised of (A) a polyester having at least two aliphatic unsaturated groups per molecule and (B) an organohydrogenpolysiloxane having at least two silicon atom-bonded hydrogen atoms per molecule;

(ii) a step of obtaining (C) a rubber particle water dispersion by curing the oil phase component comprised of the components (A) and (B) in the emulsion via a hydrosilylation reaction under the presence of a hydrosilylation reactive catalyst; and (iii) a step of obtaining rubber particles by drying and removing water as a continuous phase from (C) the rubber particle water dispersion obtained in the step (ii).

6. A method for producing the composite particles according to claim 4, comprising:

(i) a step of obtaining an O/W type emulsion by adding a surfactant-containing water phase component to an oil phase component and performing stirring, the oil phase component being comprised of (A) a polyester having at least two aliphatic unsaturated groups per molecule and (B) an organohydrogenpolysiloxane having at least two silicon atom-bonded hydrogen atoms per molecule;

(ii) a step of obtaining (C) a rubber particle water dispersion by curing the oil phase component comprised of the components (A) and (B) in the emulsion via a hydrosilylation reaction under the presence of a hydrosilylation reactive catalyst;

(iii') a step of adding (E) an alkaline substance to (C) the rubber particle water dispersion obtained in the step (ii);

(iv) a step of obtaining a composite particle water dispersion by adding (F) one kind selected from an organotrialkoxysilane or tetraalkoxysilane represented by the following general formula (3) and a hydrolysate thereof to the rubber particle water dispersion of the step (iii') to which the alkaline substance has been added, whereby a condensation reaction is caused to allow the surfaces of the rubber particles to be coated with polyorganosilsesquioxane or silica, (3)

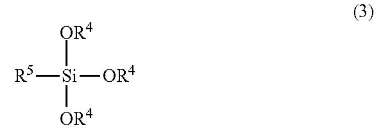

wherein $R^4$ represents a monovalent hydrocarbon group having 1 to 6 carbon atoms, $R^5$ represents a substituted or unsubstituted monovalent hydrocarbon group having 1 to 20 carbon atoms, or —$OR^4$; and (v) a step of obtaining composite particles by drying and removing water as a continuous phase from the composite particle water dispersion obtained in the step (iv).

* * * * *